United States Patent [19]

Uomori et al.

[11] Patent Number: 4,903,121
[45] Date of Patent: Feb. 20, 1990

[54] IMAGE PICK UP APPARATUS HAVING PIXEL COMPENSATION CIRCUIT

[75] Inventors: Kenya Uomori, Osaka; Atsushi Morimura, Nara; Yoshinori Kitamura, Osaka, all of Japan

[73] Assignee: Matsushita Electric Industrial Co., Ltd., Osaka, Japan

[21] Appl. No.: 193,469

[22] Filed: May 13, 1988

[30] Foreign Application Priority Data

May 14, 1987 [JP] Japan .................. 62-117946
May 22, 1987 [JP] Japan .................. 62-12612
Sep. 17, 1987 [JP] Japan .................. 62-231156

[51] Int. Cl.4 ............................ H04N 9/083
[52] U.S. Cl. ........................ 358/41; 358/43
[58] Field of Search ............... 358/41, 40-44

[56] References Cited

U.S. PATENT DOCUMENTS

| | | |
|---|---|---|
| 3,732,360 | 5/1973 | Breimer et al. . |
| 4,131,913 | 12/1978 | Yamanaka et al. . |
| 4,205,336 | 5/1980 | Nagumo . |
| 4,236,176 | 11/1980 | Nagumo . |
| 4,390,895 | 6/1983 | Sato et al. ................ 358/44 |
| 4,473,839 | 9/1984 | Noda ......................... 358/41 |
| 4,638,352 | 1/1987 | Noda et al. . |
| 4,697,208 | 9/1987 | Eino . |
| 4,714,955 | 12/1987 | Nishimura et al. ....... 358/43 |
| 4,714,966 | 12/1987 | Saito et al. . |
| 4,833,527 | 5/1989 | Kondo ...................... 358/44 |

FOREIGN PATENT DOCUMENTS 3619708 12/1986 Fed. Rep. of Germany .
0216685 10/1985 Japan .

Primary Examiner—Howard W. Britton
Assistant Examiner—Kimyen Vu
Attorney, Agent, or Firm—Pollock, VandeSande & Priddy

[57] ABSTRACT

In an image pick up apparatus having an image pick up device (1), an amplifier (2), a vertical contour compensation circuit (500), a gamma correction circuit (8), a horizontal contour compensation circuit (9), a color operation circuit (200), and an encoder (10), pixel compensation circuits (100, 100') are provided for reducing modulation components are caused by a color filter during saturation in an image pick up device (1). Horizontal low-pass circuits (7a, 7b) combined with clippers (24a, 24b) are provided in the vertical contour compensation circuit (500) to reduce a modulation components caused by such compensation in the pixel compensation circuits (100, 100').

25 Claims, 16 Drawing Sheets

FIG. 5A

| G | G | G | G | G | G |
|---|---|---|---|---|---|
| G | G | G | G | G | G |
| G | G | G | G | G | G |
| G | G | G | G | G | G |
| G | G | G | G | G | G |
| G | G | G | G | G | G |

FIG. 5B

| R | B | R | B | R | B |
|---|---|---|---|---|---|
| B | R | B | R | B | R |
| R | B | R | B | R | B |
| B | R | B | R | B | R |
| R | B | R | B | R | B |
| B | R | B | R | B | R |

I : FIRST FIELD
II : SECOND FIELD
Ye : YELLOW
Mg : MAGENTA
G : GREEN
Cy : CYAN

IMAGE PICK UP APPARATUS HAVING PIXEL COMPENSATION CIRCUIT

BACKGROUND OF THE INVENTION

1. Field of the Invention

This invention relates generally to image pick up apparatus for a video camera, a facsimile, a scanner, or a copy machine, and particularly to an image pick up apparatus having a pixel compensation circuit for reducing modulation components caused by a color filter during saturation in an image pick up device thereof.

2. Prior Art

A conventional image pick up apparatus generally comprises an image pick up device having a color filter, an amplifier for amplifying an output signal from the image pick up device, a vertical contour compensation circuit having a horizontal low-pass circuit and a horizontal contour compensation circuit for obtaining a luminance signal, a color operation circuit for obtaining color difference signals, and an encoder responsive to the luminance signal and the color difference signal for producing a color video signal. Since the luminance signal is modulated by the color filter, it is required that modulation components in the luminance signal have to be taken away. However, in the conventional method using only the horizontal low-pass circuit for cutting such modulation components, when an inputted image signal level changes, such modulation components are not satisfactorily cut away thereby causing disadvantage that zigzag portions in an image are generated at horizontal edge portions in low-frequency components and that jitters are generated in high-frequency components. As a result, an image quality is deteriorated.

SUMMARY OF THE INVENTION

The present invention has been developed in order to remove the above-described drawbacks inherent to the conventional image pick up apparatus.

It is, therefore, an object of the present invention to provide a new and useful image pick up apparatus in which modulation components by a color filter can be reduced.

It is another object of the invention to provide an image pick up apparatus for providing a satisfactory image quality.

It is a further object of the invention to provide an image pick up apparatus in which there is a difference between pixel levels in horizontal lines of an image.

In accordance with the present invention there is provided an image pick up apparatus comprising: an image pick up device means for picking up an image, for producing a pixel signal, for amplifying the pixel signal, and for producing an amplified pixel signal indicative of an output signal from the image pick up device means; a 1-H delay circuit means responsive to the output signal from the image pick up device means for delaying the output signal from the image pick up device means by 1H; a first pixel compensation circuit means responsive to an output signal from the 1-H delay circuit means for outputting a first weighted signal; a second pixel compensation circuit means responsive to the output signal from the image pick up device means for outputting a second weighted signal; a vertical contour compensation circuit means to produce a vertical contour compensation signal for emphasizing contours defined by the first and second weighted signal; a third adder means for adding the first weighted signal and the second weighted signal; a fourth horizontal low-pass circuit means responsive to an output signal from the third adder means; a fourth adder means for adding an output signal from the fourth horizontal low-pass circuit means and the vertical contour compensation signal; a circuit means responsive to an output signal from the fourth adder means to obtain luminance signal; a color operation circuit means responsive to the output signal from the image pick up device means and the output signal from the 1-H delay circuit means for obtaining color difference signals; and an encoder means responsive to the luminance signal and the color difference signals for obtaining video signal.

In accordance with the present invention there is also provided an image pick up apparatus comprising: a first image pick up device means having a green color filter for generating a first pixel signal and for amplifying the first pixel signal; a second image pick up device means having a red and blue color filter for generating second pixel signal and for amplifying the second pixel signal; a red and blue signal separating circuit means responsive to an output signal from the second image pick up device means for separating the output signal from the second image pick up device means into red signal and blue signal; a color signal processing circuit means responsive to an output signal from the first image pick up device means, the red signal, and the blue signal for producing color difference signals; a pixel compensation circuit means responsive to the output signal from the second image pick up device means for outputting a weighted signal; a second adder means for adding the weighted signal and the output signal from the first image pick up device means; a 1-H delay circuit means responsive to an output signal from the second adder means for producing a delayed signal; a vertical contour compensation circuit means to produce a vertical contour compensation signal for emphasizing contours defined by the first and second weighted signal; a third adder means for adding the output signal from the second adder means and the output signal from the 1-H delay circuit means; a third horizontal low-pass circuit means responsive to an output signal from the third adder means; a fourth adder means for adding an output signal from the third horizontal low-pass circuit means and the vertical contour compensation signal; a circuit means responsive to an output signal from the fourth adder means to obtain luminance signal; and an encoder means responsive to the luminance signal and the color difference signals for obtaining video signal.

In accordance with the present invention there is further provided an image pick up apparatus comprising: an image pick up device means includes: an image pick up device for picking up an image and for producing a pixel signal; an amplifier responsive to the pixel signal for amplifying the pixel signal and for producing an amplified pixel signal; a color temperature detecting circuit means for detecting color temperature values of the image and for producing color temperature signals each indicative of each of the color temperature values; color temperature-clip level converter means responsive to the color temperature signals for converting the color temperature signals into clip level signals indicative of clip levels each corresponding to each of the color temperature values, and for outputting the clip level signals; and a clipper means for clipping the amplified pixel signal in accordance with the clip level signals and for producing a clipped signal representing an output signal of the image pick up device means; a pixel compensation circuit means responsive to the output signal from the image pick up device means for outputting a weighted signal; a 1-H delay circuit means responsive to an output signal from the pixel compensation circuit means for delaying the output signal from the pixel compensation circuit means by 1H; a vertical contour compensation circuit means to produce a vertical contour compensation signal for emphasizing contours defined by the first and second weighted signal; a third horizontal low-pass circuit means responsive to the output signal from the pixel compensation circuit means; a second adder means for adding an output signal from the vertical contour compensation circuit means and an output signal from the third horizontal low-pass circuit means; a circuit means responsive to an output signal from the second adder means to obtain luminance signal; a color signal generating circuit means responsive to the output signal from the image pick up device means for producing color difference signals; and an encoder means responsive to the luminance signal and the color difference signals for obtaining video signal.

In accordance with the present invention there is still further provided an image pick up apparatus comprising: an image pick up device means includes: an image pick up device for picking up an image and for producing a pixel signal; amplifier responsive to the pixel signal for amplifying the pixel signal and for producing an amplified pixel signal; a color temperature detecting circuit means for detecting color temperature values of the image and for producing color temperature signals each indicative of each of the color temperature values; a color temperature-clip level converter means responsive to the color temperature signals for converting the color temperature signals into clip level signals indicative of clip levels each corresponding to each of the color temperature values, and for outputting the clip level signals; and a clipper means for clipping the amplified pixel signal in accordance with the clip level signals and for producing a clipped signal representing an output signal of the image pick up device means; a 1-H delay circuit means responsive to the output signal from the image pick up device means for delaying the output signal from the image pick up device means by 1H; a vertical contour compensation circuit means to produce a vertical contour compensation signal for emphasizing contours defined by the output signal from the image pick up device means and an output signal from the 1-H delay circuit means, the vertical contour compensation circuit means including: a subtracter means responsive to the output signal from the image pick up device means and the output signal from the 1-H delay circuit means for subtracting the output signal of the image pick up device means from the output signal of the 1-H delay circuit means; and a first horizontal low-pass circuit means responsive to an output signal from the subtracter means for obtaining the vertical contour compensation signal; a first adder means for adding the output signal from the image pick up device means and the output signal from the 1-H delay circuit means; a second horizontal low-pass circuit means responsive to an output signal from the first adder means; a second adder means for adding the vertical contour signal and an output signal from the second horizontal low-pass circuit means; a circuit means responsive to an output signal from the second adder means to obtain luminance signal; a color operation circuit means responsive to the output signal from the image pick up device means and the output signal from the 1-H delay circuit means for producing color difference signals; and an encoder means responsive to the luminance signal and the color difference signals for obtaining video signal.

In accordance with the present invention there is still further provided an image pick up apparatus comprising: an image pick up device means including: an image pick up device for picking up an image and for producing a pixel signal; and an amplifier responsive to the pixel signal for amplifying the pixel signal and for producing an amplified pixel signal indicative of an output signal from the image pick up device means; a 1-H delay circuit means responsive to the output signal from the image pick up device means for delaying the output signal from the image pick up device means by 1H; a first selector means responsive to the output signal from the image pick up device means and an output signal from the 1-H delay circuit means for selecting one signal which is to be compensated and for outputting the one signal and the other signal, and the first selector means having a first input terminal in which the output signal from the image pick up device means is inputted and a second input terminal in which the output signal from the 1-H delay circuit means; a pixel compensation circuit means responsive to the one signal from the first selector means for outputting a weighted signal, the pixel compensation circuit means including: a pixel weighting circuit means responsive to the one signal from the first selector means for weighting the one signal from the first selector means; and a band separating operation circuit means for weighting a high-frequency component signal in the one signal from the first selector means, the first band separating operation circuit means having: a horizontal high-pass circuit means responsive to an output signal from the pixel weighting circuit means; a first horizontal low-pass circuit means responsive to the one signal from the first selector means; and a first adder means for adding an output signal from the horizontal high-pass circuit means and an output signal from the first horizontal low-pass circuit means and for outputting the weighted signal; a second selector means responsive to the weighted signal and the other signal from the first selector means for outputting the weighted signal and the other signal from the first selector means such that the weighted signal is outputted from first terminal of the second selector means when the one signal which is to be compensated is inputted into the first terminal of the first selector means and that the weighted signal is outputted from the second terminal of the second selector means when the one signal which is to be compensated is inputted into the second terminal of the first selector means; a vertical contour compensation circuit means to produce a vertical contour compensation signal for emphasizing contours defined by output signals from the first and second terminals of the second selector means, the vertical contour compensation circuit means including: a subtracter means responsive to the output signals from the first and second terminals of the second selector means for subtracting the output signal of the second terminal of the second selector means from the output signal from the second terminal of the second selector means; and a second horizontal low-pass circuit means responsive to an output signal from the subtracter means for obtaining the vertical contour compensation signal; a second adder means for adding the output signals from the first and second terminals of the second selector means; a third horizontal low-pass circuit means responsive to an output signal from the second adder means; a third adder means for adding an output signal from the third horizontal low-pass circuit means and the vertical contour compensation signal; a circuit means responsive to an output signal from the third adder means to obtain luminance signal; a color operation circuit means responsive to the output signal from the image pick up device means and the output signal from the 1-H delay circuit means for obtaining color difference signals; and an encoder means responsive to the luminance signal and the color difference signals for obtaining video signal.

BRIEF DESCRIPTION OF THE DRAWINGS

The object and features of the present invention will become more readily apparent from the following detailed description of the preferred embodiments taken in conjunction with the accompanying drawings in which:

FIG. 5A is a diagram showing a structure of a green color filter used in a first image pick up device of FIG. 4;

FIG. 5B is a diagram showing a structure of a red and blue color filter used in a first image pick up device of FIG. 4;

The same or corresponding elements and parts are designated at like reference numerals throughout the drawings.

DETAILED DESCRIPTION OF THE INVENTION

Prior to describing the preferred embodiments of the present invention, the above-mentioned conventional image pick up apparatus will be described for a better understanding of the present invention.

Figure 21:
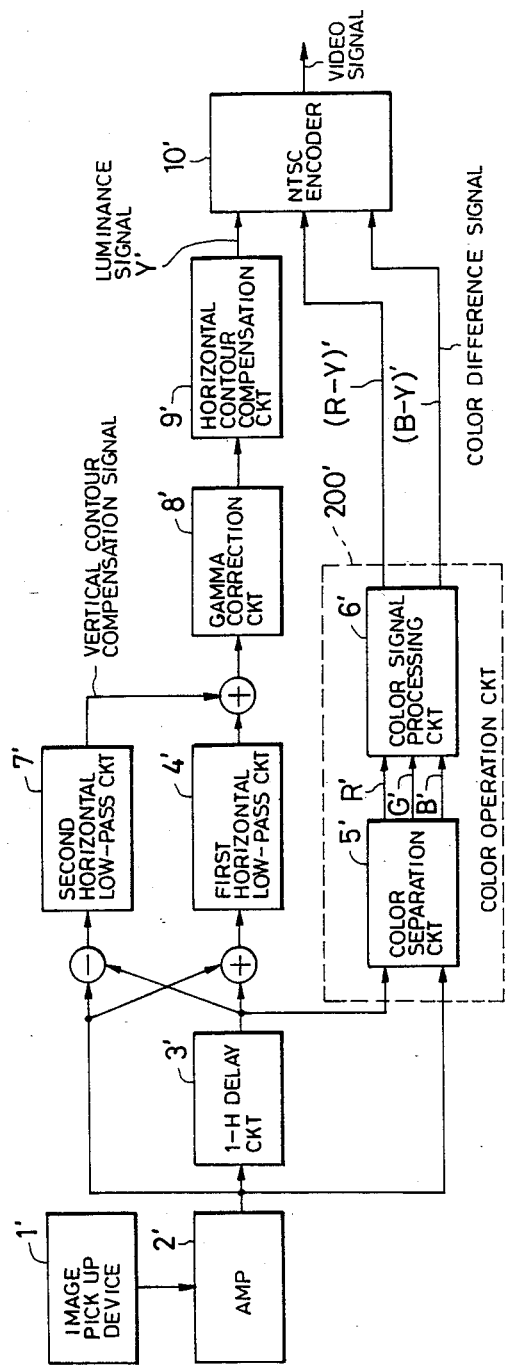
FIG. 21 is a block diagram of a conventional image pick up apparatus.
Figure 22:
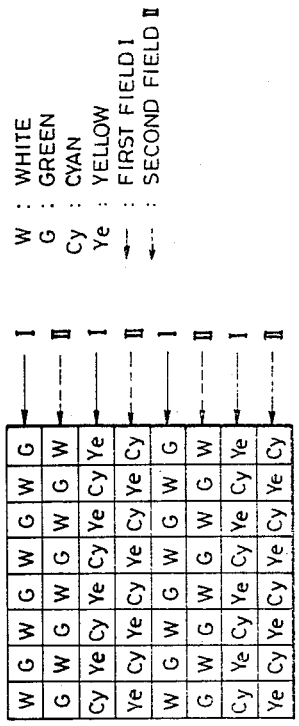
FIG. 22 is a structure of a color filter used in an image pick up device of FIGS. 21, 1, 3, 6, 11, 15, and 17.

One example of conventional image pick up apparatus is illustrated at FIG. 21, and FIG. 22 shows a conventional color filter which is applied to the conventional image pick up device thereof. The conventional image pick up apparatus generally comprises an image pick up device 1', an amplifier 2', a 1-H delay circuit 3', a first horizontal low-pass circuit 4', a second horizontal low-pass circuit 7', a gamma correction circuit 8', a horizontal contour compensation circuit 9', an NTSC encoder 10', and a color operation circuit 200'. The color operation circuit 200' includes a color separation circuit 5' and a color signal processing circuit 6'.

The color filter is provided in the image pick up device 1' for obtaining color signals of R, G, and B, and the following formulas 1 and 2 are operated in the image pick up device 1', for example.

$$W - Cy = Ye - G = R \quad (1)$$

$$W - Ye = Cy - G = B \quad (2)$$

where W shows white; Cy shows cyan; Ye shows yellow; G shows green; R shows red; and B shows blue. In addition, an arrow shows a first field I, and a dotted arrow shows a second field II.

An output signal from the image pick up device 1' is amplified in the amplifier 2' and this amplified signal is delayed in the 1-H delay circuit 3' for providing the coincidence of an amplified signal outputted from the amplifier 2' and a delayed signal outputted from the 1-H delay circuit 3'. Color difference signals of (R−Y)' and (B−Y)' are obtained by means of the color operation circuit 200' with such two coincided signals of the amplified signal and the delayed signal being fed thereto. In the color operation circuit 200', the coincided signals are received by the color separation circuit 5' for obtaining signals of R', G', and B', and these signals R', G', and B' are subsequently inputted into the color signal processing circuit 6' for producing color difference signals (R−Y)' and (B−Y)'.

Meanwhile, a luminance signal Y' is obtained in the following way. First, the coincided two signals are added in an adder and the amplified signal in the coincided signals is subtracted from the delayed signal in the coincided signals. Second, an added signal outputted from the adder is fed to a first horizontal low-pass circuit 4' for cutting a high-frequency band, i.e. modulation components, and a subtracted signal from the subtracter is fed to a second horizontal low-pass circuit 7'. Since the combination of the subtracter and the second horizontal low-pass circuit 7' is vertical contour compensation circuit, an output signal from the second horizontal low-pass circuit 7' shows a vertical contour compensation signal. Third, the vertical contour compensation signal and an output signal from the first horizontal circuit 4' are added, and this added signal is fed to the gamma correction circuit 8'. Finally, a gamma-compensated signal from the gamma compensation circuit 8' is sent to the horizontal contour compensation circuit 9' thereby producing a luminance signal Y'. In the NTSC encoder 10', a video signal is produced by receiving and encoding the luminance signal Y' and the color difference signals (R−Y)' and (B−Y)'.

In this conventional image pick up apparatus, since the luminance signal Y' is modulated by the color filter, it is required that modulation components in the luminance signal Y' have to be cut. However, in the conventional method using only the first horizontal low-pass circuit 4' for cutting such modulation components, when an inputted image signal level changes, such modulation components cannot be satisfactorily taken away thereby causing the disadvantage that zigzag portions in an image are generated at horizontal edge portions in low-frequency components because the kind of arrangement of colors in the filter is converted every field as shown in FIG. 22, and that jitters are generated in high-frequency components. As a result, an image quality is deteriorated.

With reference to FIGS. 1-20 and 22, the embodiments of the present invention will be described hereinbelow.

Figure 1:
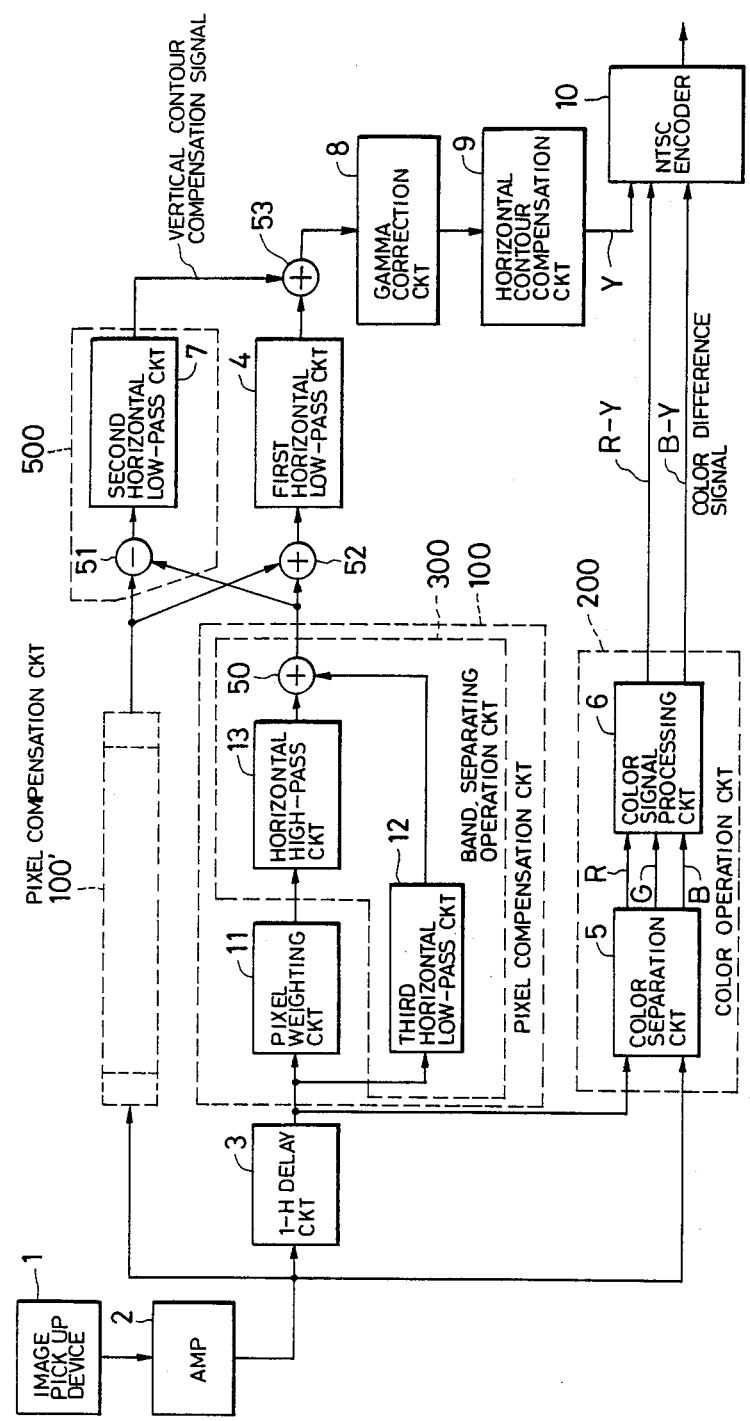
FIG. 1 is a block diagram of an image pick up apparatus according to a first embodiment of the present invention.

FIG. 1 shows an image pick up apparatus according to a first embodiment of the invention. In this embodiment, the image pick up apparatus generally comprises an image pick up device 1 for picking up an image and for producing a pixel signal by using a color filter which is shown in FIG. 22, an amplifier 2, a 1-H delay circuit 3, a first pixel compensation circuit 100, a second pixel compensation circuit 100' having the same structure as the first pixel compensation circuit 100, a first adder 52, a first horizontal low-pass circuit 4, a vertical contour compensation circuit 500 including a subtracter 51 and a second horizontal low-pass circuit 7, a second adder 53, a gamma correction circuit 8, a horizontal contour compensation circuit 9, a color operation circuit 200 including a color separation circuit 5 and a color signal processing circuit 6, and an NTSC encoder 10. The pixel compensation circuit 100 includes a pixel weighting circuit 11 and a band separating operation circuit 300 having a horizontal high-pass circuit 13, a third horizontal low-pass circuit 12, and a third adder 50. As will be seen from above, the structure of the first embodiment has the same structure as the prior art except for the first and second pixel compensation circuits 100 and 100'.

Now the operation of the image pick up apparatus having the above-mentioned structure will be described. The pixel signal produced by the image pick up apparatus 1 is amplified in the amplifier 2 responsive to the pixel signal for producing an amplified pixel signal. The amplified pixel signal is delayed by 1H in the 1-H delay circuit 3 for coincidentally processing the amplified signal. Such a delayed signal produced by 1-H delay circuit 3 is fed to the pixel compensation circuit 100, and the amplified signal is fed to the second pixel compensation circuit 100' for respectively producing a first weighted signal and a second weighted signal. Since the first and second pixel compensation circuits have the same structure, the description of the second pixel compensation circuit is omitted.

Figure 2A:
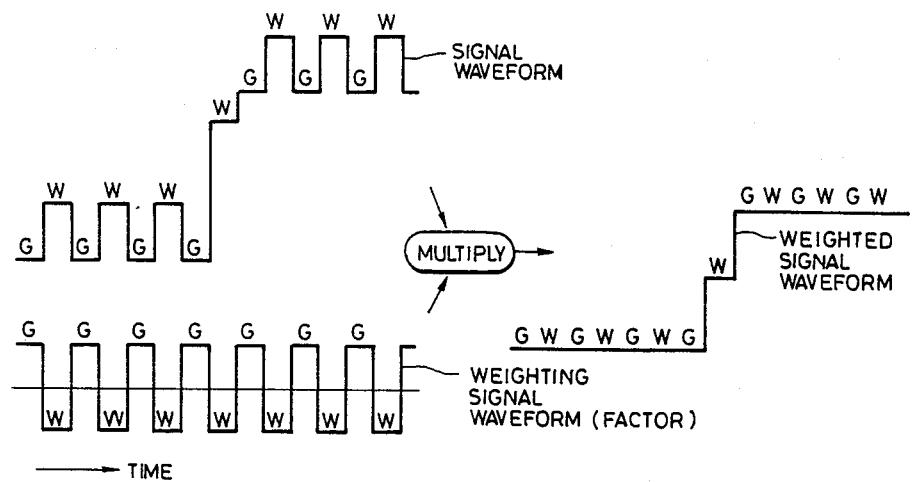
FIG. 2A is a diagram for a description of a weighting method according to a pixel weighting circuit of FIG. 1.
Figure 2B:
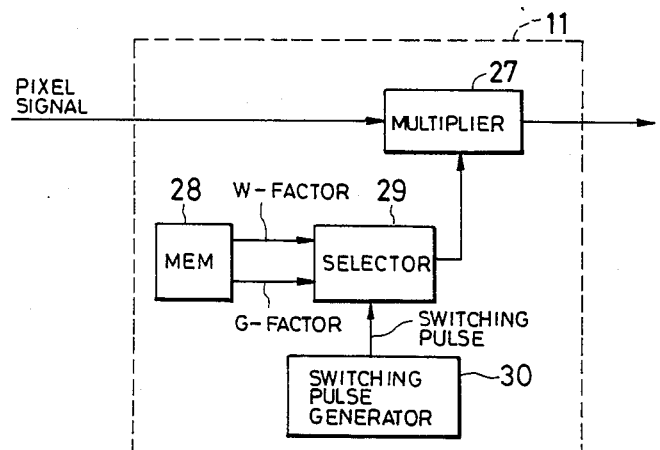
FIG. 2B is a block diagram of the pixel weighting circuit according to the invention.

In the first pixel compensation circuit 100, the delayed signal is weighted in the weighting circuit 11. As shown in FIG. 2A, for example, a delayed signal is weighted by a weighting signal such that modulation components caused by the difference between pixel signal levels of white and green are canceled. In FIG. 2A, a weighted signal is produced by multiplying the delayed signal and the weighting signal. FIG. 2B is a block diagram showing the pixel weighting circuit 11. The pixel weighting circuit 11 generally comprises a switching pulse generator 30 for generating switching pulses, a memory 28, a selector 29, and a multiplier 27. In the memory 28, factors of white and green are predetermined and stored therein, and are sent to selector 29. The weighting signal is defined by the factors, and is fed to the multiplier 27 from the selector 29. In the selector 29, one of the factors is selected out in accordance with the switching pulses such that each white portion in the delayed signal corresponds to each white portion in the weighting signal as shown in FIG. 2A. More specifically, the memory 28 outputs at least two factors which are to be multiplied by the delayed signal. In the multiplier 27, the delayed signal is multiplied by the weighting signal thereby obtaining the weighted signal. In FIGS. 2A and 2B, although the method for weighting by using two factors is described, in the first embodiment, since the color filter of the image pick up device 1 has four kinds of colors, selector 29 is designed as of the four-input and one-output type, and predetermined four factors are stored in the memory 28.

Next, the operation of the band separating circuit 300 will be described. Such a weighted pixel signal is fed to the horizontal high-pass circuit 13 for extracting only high-frequency components, and a delayed signal indicative of a non-weighted pixel signal is fed to the third horizontal low-pass circuit 12 for extracting only low-frequency components. Therefore, a signal in which only high-frequency components thereof are weighted is obtained by means of the third adder 50 for adding the weighted signal and the non-weighted signal. It means that modulation components caused by the color filter can be reduced and that the difference between W-G line level and Cy-Ye line level does not generate. Thus, in the first pixel compensation circuit 100, a delayed signal is inputted for producing a first weighted signal. Similarly, in the second pixel compensation circuit 100', a non-delayed signal indicative of the output signal from the amplifier 2 is inputted for producing a second weighted signal.

In the first adder 52, the first and second weighted signals are added, and such an added signal is sent to the first horizontal low-pass circuit 4 for cutting high-frequency components. Meanwhile, the second weighted signal is sent to the vertical contour compensation circuit 500 for producing a vertical contour compensation signal to emphasize contours defined by the first and second signals. More specifically, the second weighted signal is fed to the subtracter 51 for subtracting the second weighted signal from the first weighted signal, and such a subtracted signal is supplied to the second horizontal low-pass circuit 7. The output signal of the second horizontal low-pass circuit 7 is a vertical contour compensation signal. In the second adder 53, the vertical contour compensation signal and an output signal from the first horizontal low-pass circuit 7 are added, and such an added signal is fed to the gamma correction circuit 8. Then, an output signal from the gamma correction circuit 8 is sent to the horizontal contour compensation circuit for obtaining a luminance signal.

The color difference signals of R−Y and B−Y are obtained by means of the color operation circuit 200 responsive to a non-delayed signal and a delayed signal. The color separation circuit 5 is receiving the non-delayed signal and the delayed signal for producing color signals R, G, and B. In the color signal processing circuit 6, the produced color signals R, G, and B are inputted for producing a color difference signals R−Y and B−Y. Finally, the NTSC encoder 10 produces a video signal by means of receiving the luminance Y signal and the color difference signal R−Y, B−Y.

Figure 3:
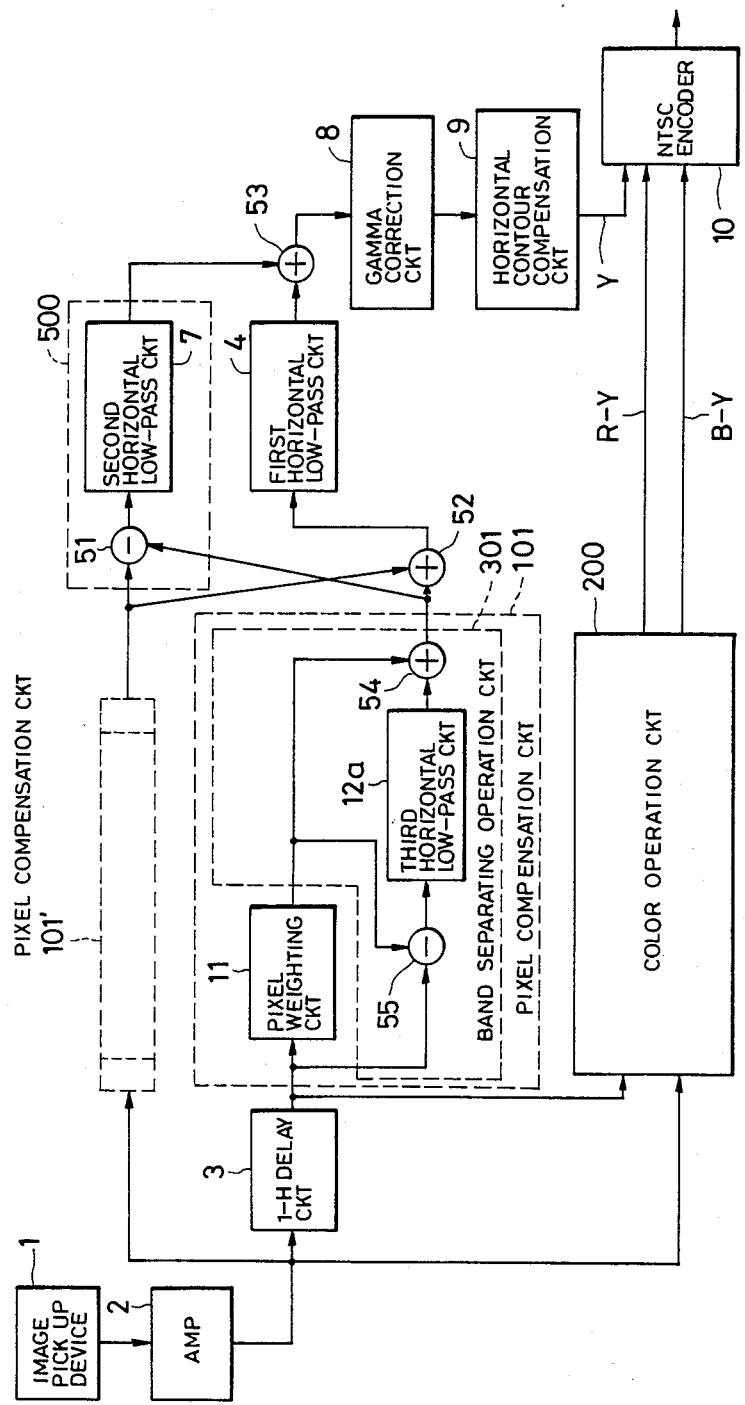
FIG. 3 is a block diagram of an image pick up apparatus according to a second embodiment of the present invention.

FIG. 3 is a block diagram of an image pick up apparatus according to second embodiment of the invention. The second embodiment has a same structure as the first embodiment of FIG. 1 except for a pixel comepnsation circuit 101 and a pixel compensation circuit 101' having the same structure and operation as the pixel compensation circuit 101. Namely, in the second embodiment, a band separating operation circuit 301 is provided in the pixel compensation circuit 101. Therefore, the description of another band separating operation circuit in the pixel compensation circuit 101' is omitted.

The band separating operation circuit 301 generally comprises a subtracter 55 for subtracting the output signal of the pixel weighting circuit 11 from the output signal of the non-weighted signal, a third horizontal low-pass circuit 12a responsive to an output signal from the subtracter 55, and an adder 54 for adding the output signal from the pixel weighting circuit 11 and an output signal from the third horizontal low-pass circuit 12a.

Assuming that the low-frequency component in the output signal from the image pick up device 1 is L; the high-frequency component thereof is H; the low-frequency component in the output signal from the pixel weighting circuit 11 is L'; and the high-frequency component of the same is H', in FIG. 3, the output signal of the pixel weighting circuit 11 is L'+H', and the non-weighted signal is L+H. Therefore, the output signal from the subtracter 55 is (L+H)−(L'+H'), and then L−L' is passed through the third horizontal low-pass circuit 12a. As a result, in the adder 54, (L'+H')+(L−L')=L+H' is obtained. It means that only the high-frequency component is weighted in the similar manner to the first embodiment of FIG. 1. The above-mentioned band separating operation circuit 300 or 301 can be applied to a third, fourth, sixth, and seventh embodiment of the invention describing hereinbelow.

Figure 4:
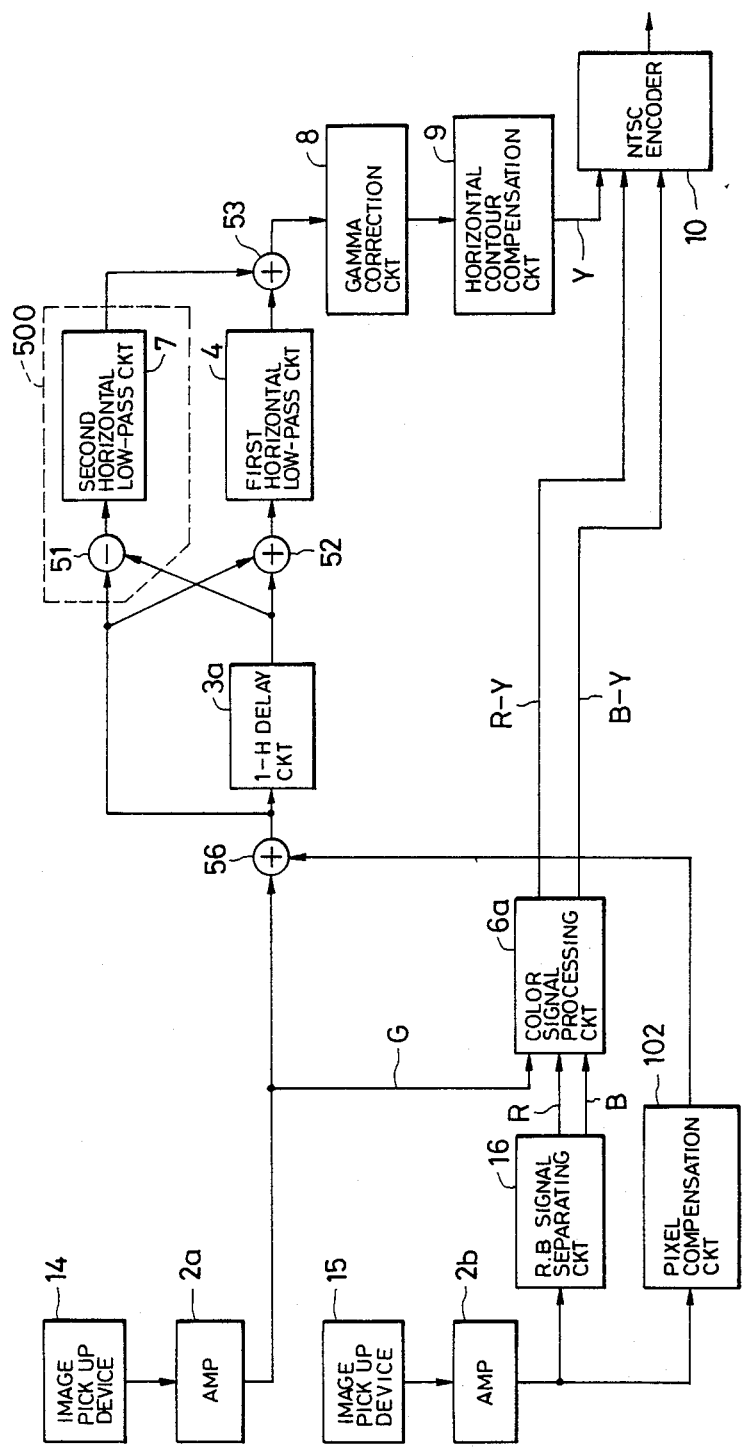
FIG. 4 is a block diagram of an image pick up apparatus according to a third embodiment of the present invention.

FIG. 4 is an image pick up apparatus according to the third embodiment of the invention. In the third embodiment, image pick up devices 14 and 15 are provided. The image pick up device 14 has a green color filter shown in FIG. 5A, and the image pick up device 15 has a red and blue color filter shown in FIG. 5B. In the image pick up device 15, since there are modulation components caused by the difference of levels between red and blue pixel signals, a pixel compensation circuit 102 is also provided for cutting the modulation components thereof. The pixel compensation circuit 102 has the same structure and operations as the pixel compensation circuits 100 or 101 described above. Then, an output signal from the pixel compensation circuit 102 and a pixel signal passing through an amplifier 2a are added in a adder 56. As to the luminance signal Y, the following processings are the same as the first embodiment.

As to the color difference signals R−Y and B−Y, in a red and blue separating circuit 16 responsive to a pixel signal passing through an amplifier 2b, color signals of red and blue are outputted to a color signal processing circuit 6a. In the color signal processing circuit 6a, the output signal from the amplifier 2a and the output signals from red and blue separating circuit 16 are received and operated for producing the color difference signals R−Y and B−Y.

Figure 6:
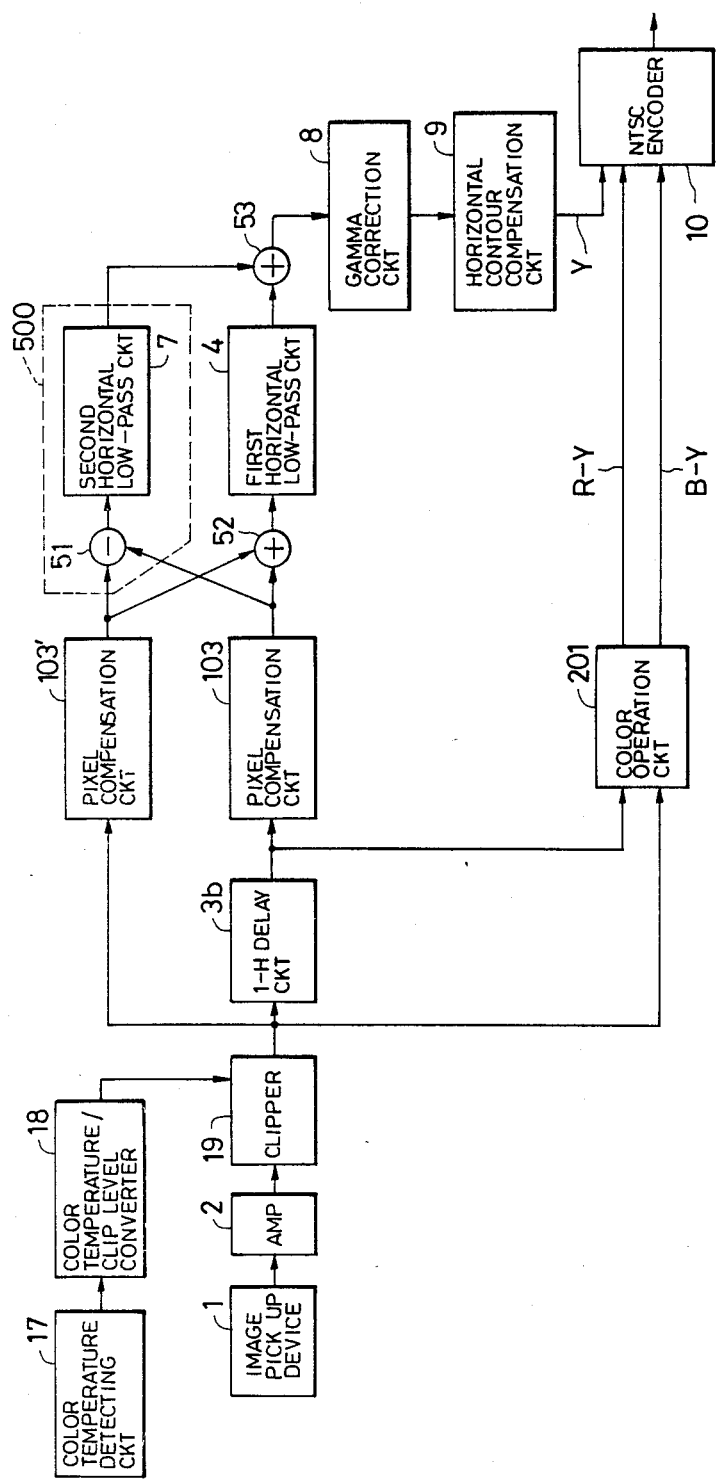
FIG. 6 is a block diagram of an image pick up apparatus according to a fourth embodiment of the present invention.

FIG. 6 is a block diagram showing an image pick up apparatus according to a fourth embodiment of the present invention. In the above-mentioned image pick up apparatus of the invention, it is to be noted that since there are a variety of the pixel output signal level of cyan and yellow in accordance with the color temperatures of images, if weighting factors are determined in accordance with the color temperatures, the modulation components caused by a color filter can be effectively reduced. On the contrary, since the pixel output signals of white and green slightly changes in accordance with the color temperatures of images, it is not required that the weighting factors are determined by the color temperatures.

The fourth embodiment has the same structure as the first or second embodiment of the invention except that there is provided not only the image pick up device 1 and the amplifier 2 but also a color temperature detecting circuit 17, a color temperature-clip level converter 18, and a clipper 19 as an image pick up device means. The color temperature detecting circuit 17 detectes color temperature values of the image, and the color temperature values are fed to the color temperature-clip level converter 18 for converting each of the color temperature values into a corresponding clip level.

Figure 7:
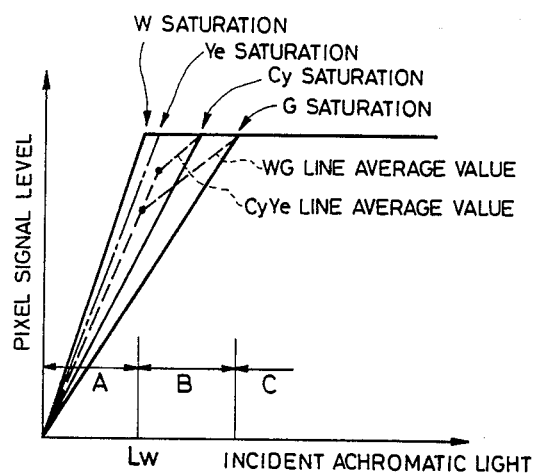
FIG. 7 is a graph showing incident achromatic light-pixel signal level characteristics of an image pick up device according to the fourth embodiment.
Figure 8:
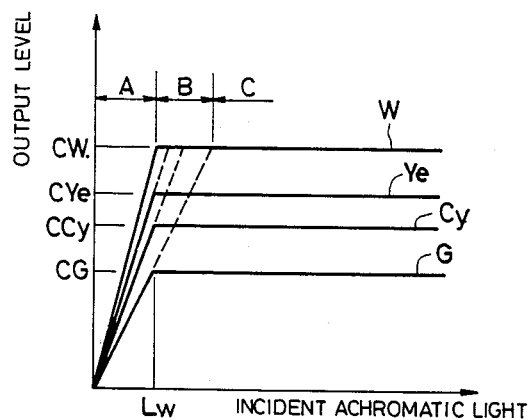
FIG. 8 is a graph showing input-output characteristics of a clipper when picking up achromatic light according to the fourth embodiment.

Here, a method for reducing modulation components caused by saturation in the image pick up device 1 will be described. FIG. 7 is a graph showing incident achromatic light-pixel signal level characteristics of an image pick up device 1 according to the fourth embodiment. As shown in FIG. 7, if the incident achromatic light is increased, a white pixel signal, a yellow pixel signal, a cyan pixel signal, and a green pixel signal are subsequently saturated. It is assumed that an input level in which the white pixel signal is saturated is Lw; an area in which any pixel signal is not saturated is area A; an area in which all pixel signals are saturated is area C;

and a remaining area is area B. The pixel signal passed through the amplifier 2 is fed to the clipper 19. FIG. 8 is a graph showing input-output characteristics of a clipper 19 when picking up achromatic light according to the fourth embodiment. In FIG. 8, the saturation level Lw of the white pixel signal is a reference level, and a clip level of each of yellow, cyan, and green pixel signal is respectively defined as CYe, CCy, and CG by the saturation level Lw. Therefore, a clip level CW of the white pixel signal is necessarily defined as a saturation level in the image pick up device 1.

Figure 9:
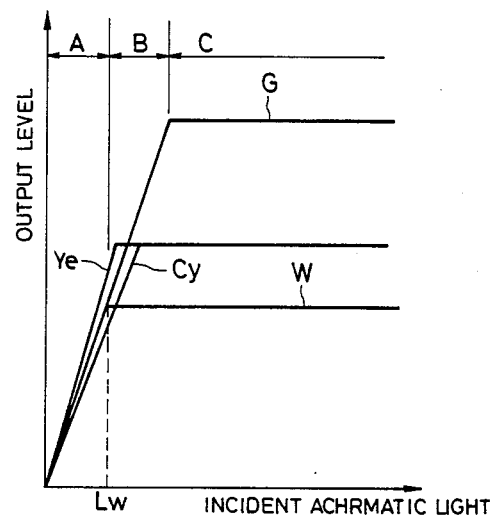
FIG. 9 is a graph showing input-output characteristics of a pixel compensation circuit when picking up achromatic light and when the clipper is not used according to the fourth embodiment.
Figure 10:
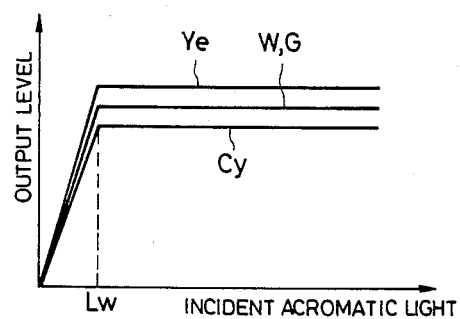
FIG. 10 is a graph showing input-output characteristics of a pixel compensation circuit when picking up achromatic light and when the clipper is used according to the fourth embodiment.

FIG. 9 is a graph showing input-output characteristics of pixel compensation circuits 103 and 103' when picking up achromatic light and when the clipper 19 is not used according to the fourth embodiment. Particularly, in FIG. 9, the characteristics of high-frequency components in each pixel signal are illustrated, and the same of low-frequency components therein are shown in FIG. 7. In FIG. 9, the pixel signal level is in the area B or C, the difference of levels between the white pixel signal and the green pixel signal is generated due to the compensation thereof. As a result, an image quality is deteriorated. If the characteristics of the clipper 19 are designed as shown in FIG. 8, the input-output characteristics of the pixel compensation circuits 103 and 103' are obtained as shown in FIG. 10. FIG. 10 is a graph showing input-output characteristics of pixel compensation circuits 103 and 103' when picking up achromatic light and when the clipper 19 is used according to the fourth embodiment. Therefore, the difference of the level between the white pixel signal and the green signal level is not generated and the difference of the level between the cyan pixel signal and the yellow signal signal is also not generated. As a result, the deterioration of an image quality is prevented.

Figure 11:
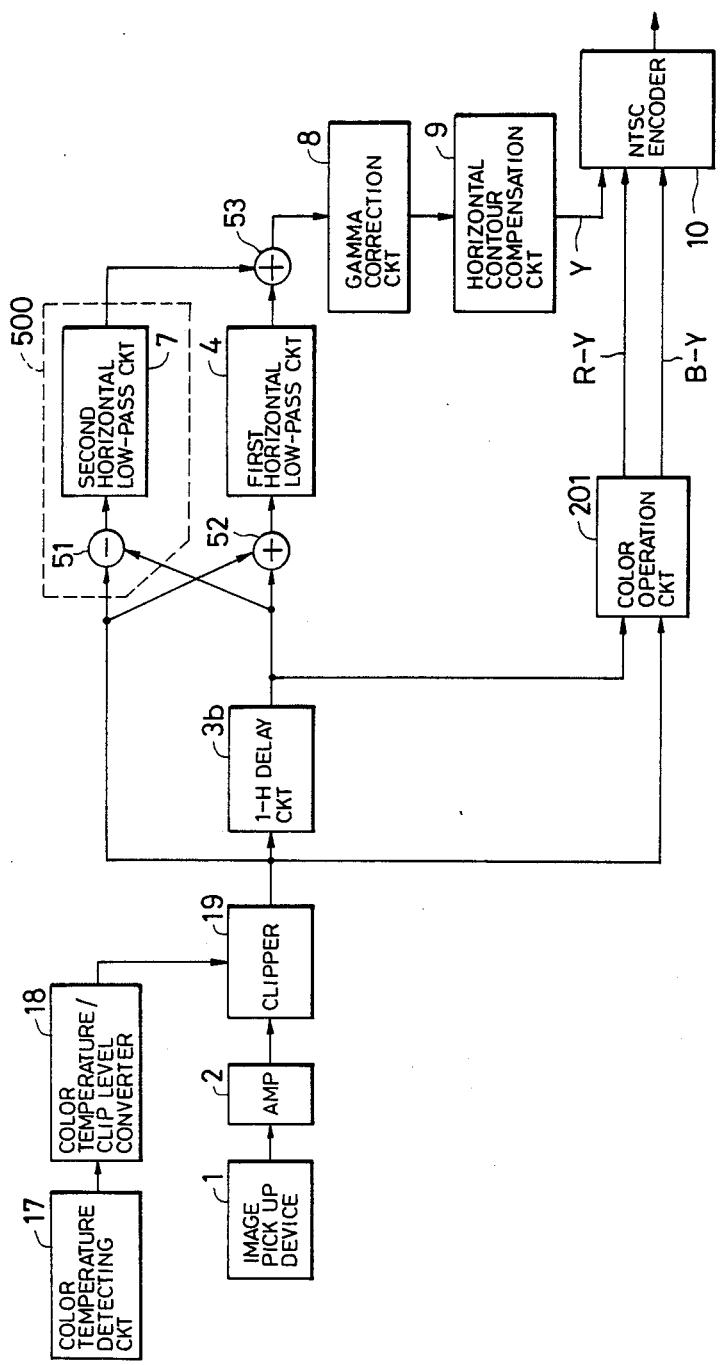
FIG. 11 is a block diagram of an image pick up apparatus according to a fifth embodiment of the present invention.

FIG. 11 is a block diagram of an image pick up apparatus according to a fifth embodiment of the present invention. The image pick up apparatus of the fifth embodiment has the same structure and operations as the fourth embodiment except that the pixel compensation circuits 103 and 103' are not provided in the fifth embodiment. Even in the fifth embodiment, the advantageous effects caused by the clipper 19 are obtained.

Figure 12:
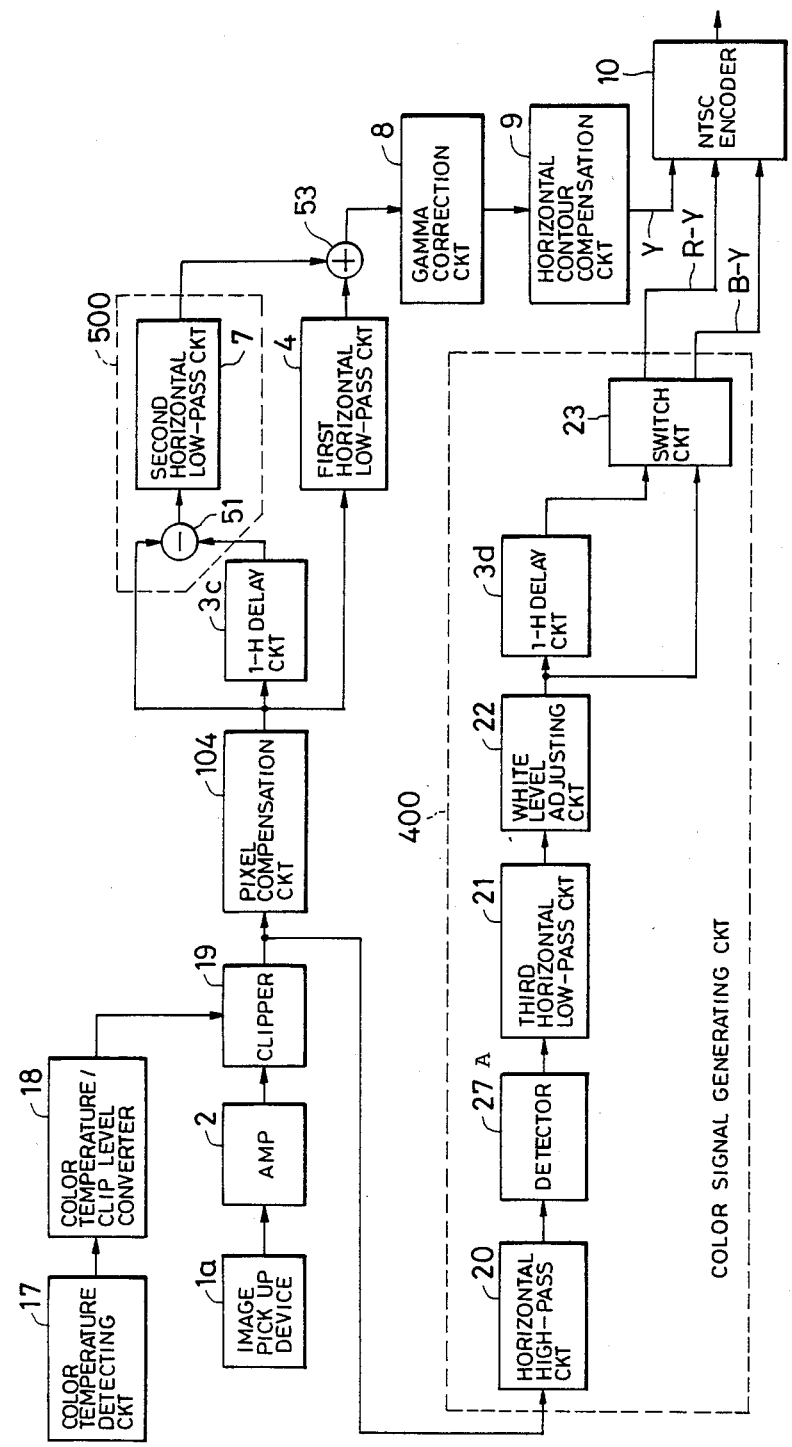
FIG. 12 is a block diagram of an image pick up apparatus according to a sixth embodiment of the present invention.
Figure 13:
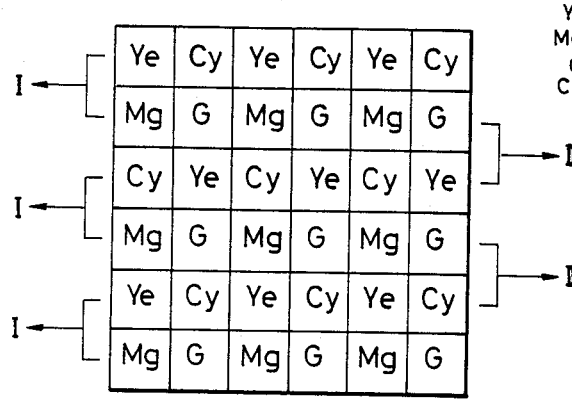
FIG. 13 is a diagram showing a structure of a color filter used in an image pick up device of FIG. 12.

FIG. 12 is a block diagram of an image pick up apparatus according to a sixth embodiment of the present invention, and FIG. 13 is a diagram showing a structure of a color filter used in an image pick up device 1a of FIG. 12. In the sixth embodiment, two vertically adjacent pixels of on the filter are added and outputted as one pixel in each line of the fields as shown in FIG. 13. A pixel compensation circuit 104 has the same structure as the pixel compensation circuit 100 or 101, and a color signal generating circuit 400 responsive to the output signal from the clipper 19 for producing color difference signal is provided. The color signal generating circuit 400 generally comprises a horizontal high-pass circuit 20 responsive to the output signal from the clipper 19 for extracting a frequency band corresponding to a half of the sampling frequency, a detector 27 for detecting an output signal from the horizontal high-pass circuit 20, a horizontal low-pass circuit 21 responsive to an output signal from the detector 27a, a white level adjusting circuit 22 for adjusting a white pixel level in output signal from the horizontal low-pass circuit 21, a 1-H delay circuit 3d responsive to an output signal from the white level adjusting circuit 22, a switching circuit 23 responsive to said output signal from the white level adjusting circuit 22 and an output signal from the 1-H delay circuit 3d for coincidentally outputting signals indicative of the color difference signals R−Y and B−Y.

Figure 14:
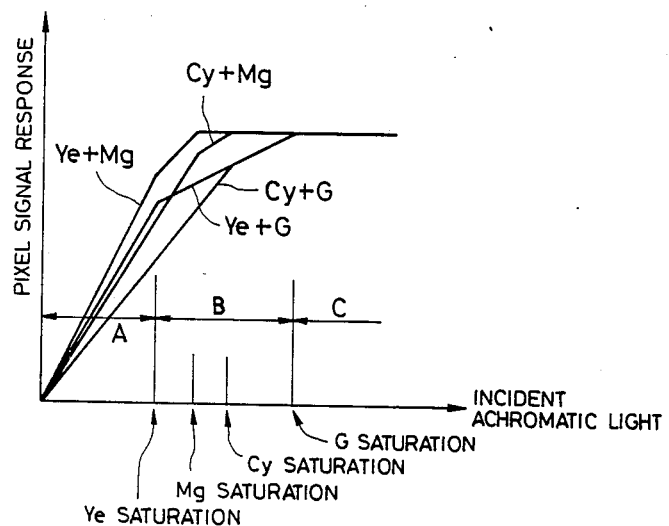
FIG. 14 is a graph showing incident achromatic light-pixel signal level characteristics of an image pick up device according to the sixth embodiment.

FIG. 14 is a graph showing incident achromatic light-pixel signal level characteristics of an image pick up device 1a according to the sixth embodiment. In the area B or C, the difference of the level between Ye+Mg pixel signal and Cy+G pixel signal in the output signal of the pixel compensation circuit 104 is increased. Therefore, if the pixel signal level is limitted as shown by dotted lines of FIG. 14, modulation components caused by the color filter during saturation in the image pick up device 1a can be reduced. In the fourth, fifth, and sixth embodiments of the invention, although the clip levels are determined in accordance with the color temperature of an image, the clip levels may be stable. In this case, color signals must be changed to white signal at the portion near each of corresponding clip levels.

Figure 15:
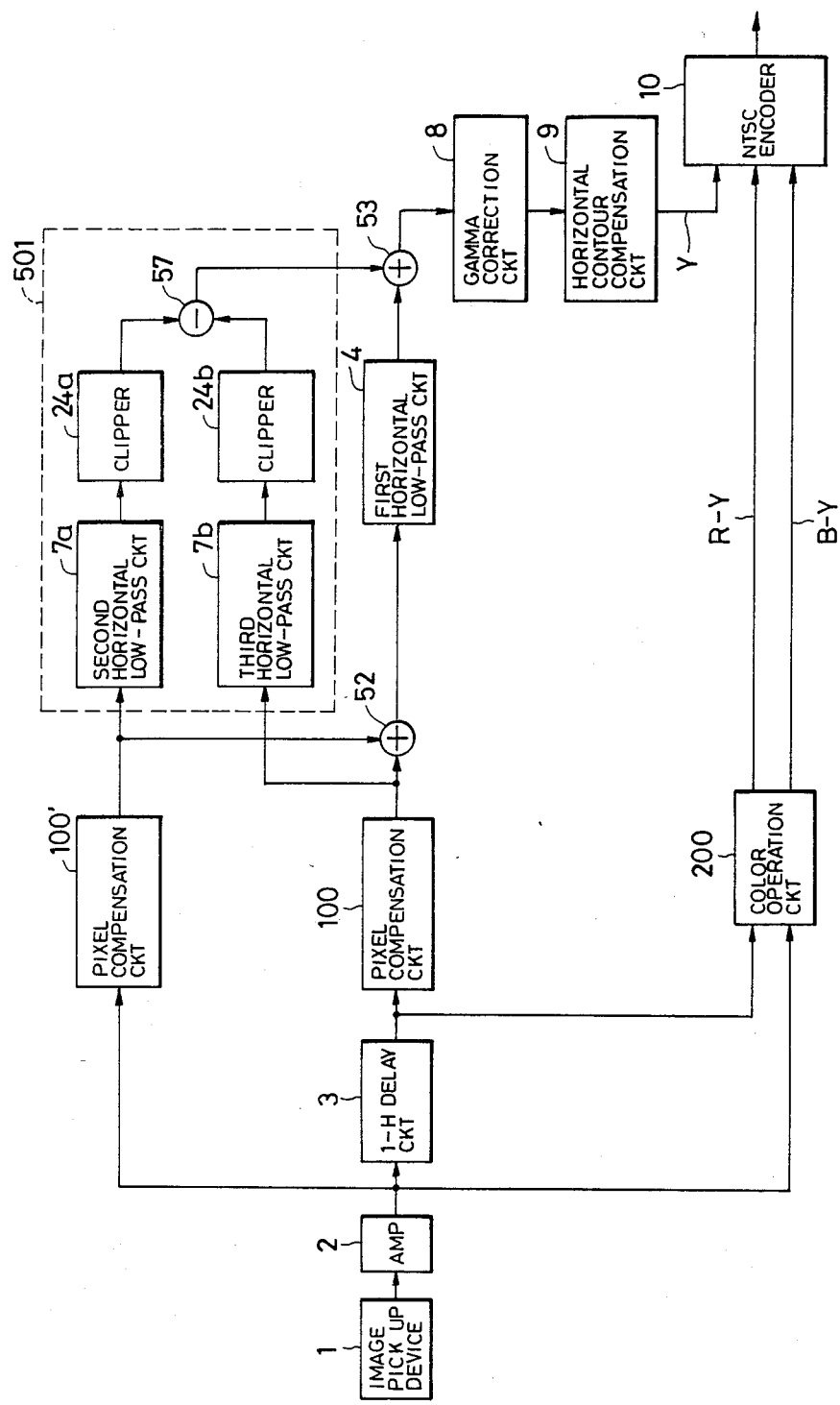
FIG. 15 is a block diagram of an image pick up apparatus according to a seventh embodiment of the present invention.

FIG. 15 is a block diagram of an image pick up apparatus according to a seventh embodiment of the present invention. In this embodiment, the image pick up apparatus has the same structure as the first embodiment except that a vertical contour compensation circuit 501 is provided instead of the vertical contour compensation circuit 500. The vertical contour compensation circuit 501 generally comprises a horizontal low-pass circuit 7a responsive to the second weighted signal from the pixel compensation circuit 100', a clipper 24a for clipping an output signal from the horizontal low-pass circuit 7a in accordance with a predetermined clip value, a horizontal low-pass circuit 7b responsive to the first weighted signal outputted from the pixel compensation circuit 100, a clipper 7b for clipping an output signal from the horizontal low-pass circuit 7b in accordance with the predetermined clip value, a subtracter 57 for subtracting an output signal of the clipper 24a from an output signal of the second clipper 24b and for sending such a subtracted signal to the adder 53. This vertical compensation circuit 501 may also be used in the sixth embodiment of FIG. 12 in place of vertical compensation circuit 500.

Figure 16:
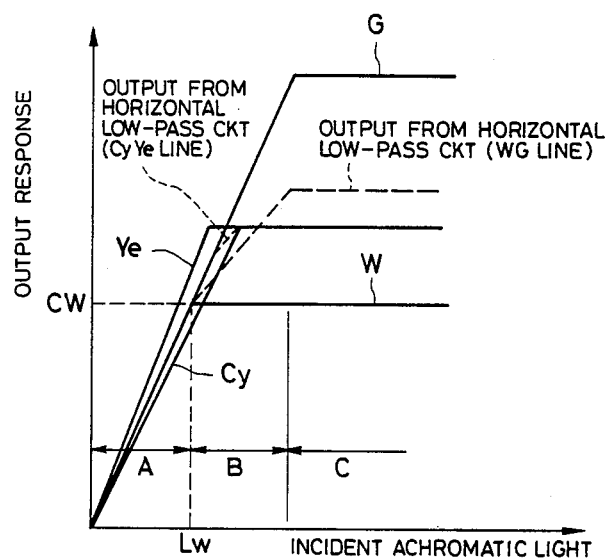
FIG. 16 is a graph showing input-output characteristics of high-frequency components in a pixel compensation circuit when picking up achromatic light and when the clipper is not used according to the seventh embodiment.

The vertical contour compensation signal in the seventh embodiment of FIG. 15 will be described hereinbelow. FIG. 16 is a graph showing input-output characteristics of high-frequency components in pixel compensation circuits 100 and 100' when picking up achromatic light and when the clipper is not used according to the seventh embodiment. In FIG. 16, the characteristics of low-frequency components in each output signal from the pixel compensation circuit 100 and 100' is illustrated at FIG. 7. If the incident achromatic light level is in the area B or C, the difference of level between the white pixel signal and the green pixel signal is generated as shown in FIG. 16. Here, if the clip levels are determined as a level of CW or below, even in the areas B and C, the difference of level between an average value defined by the white and green pixel and an average value defined by the cyan and yellow pixel is not generated. As a result, the image quality is not deteriorated.

Figure 18:
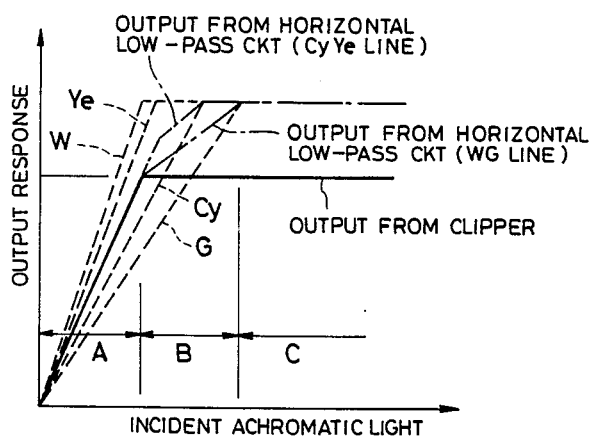
FIG. 18 is a graph showing an output signal from the clipper responding to an input signal into the horizontal low-pass circuit prior to the clipper according to the eighth embodiment.
Figure 17:
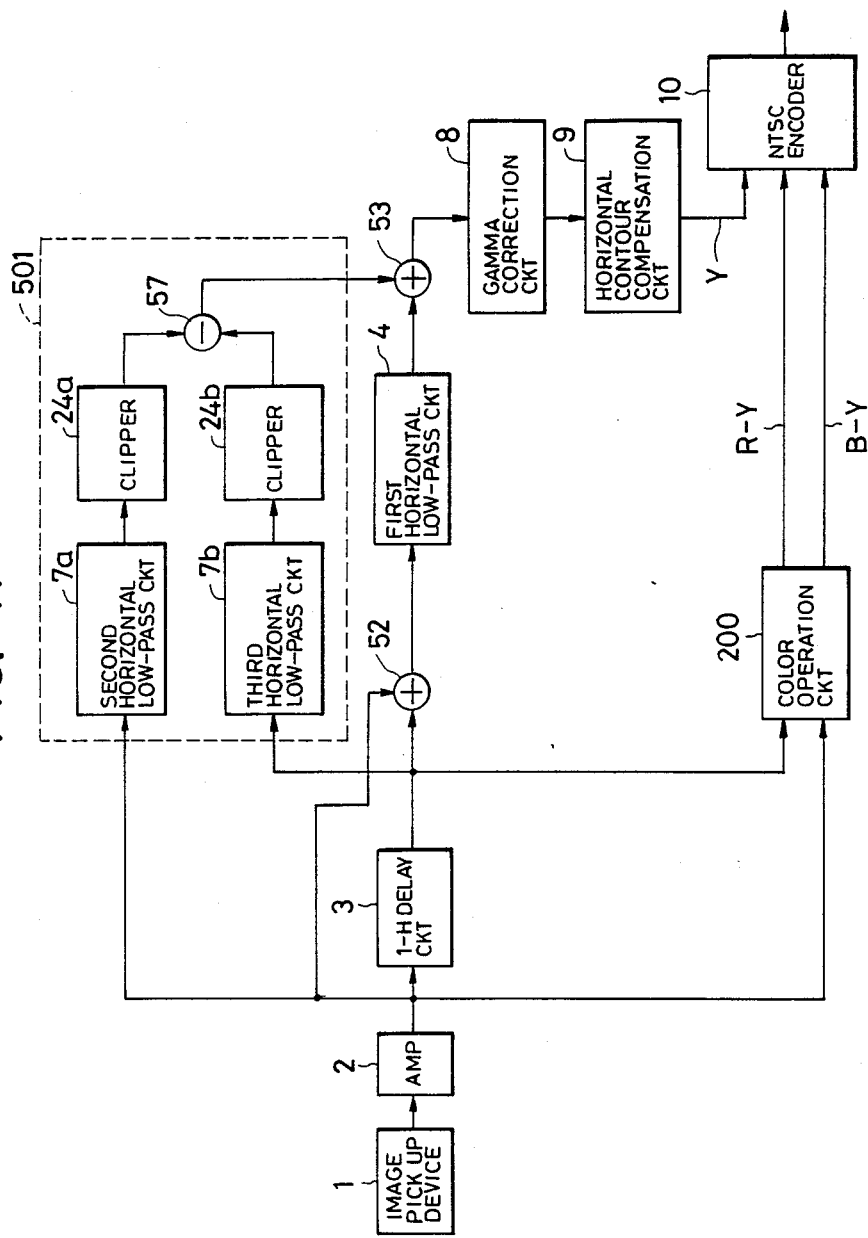
FIG. 17 is a block diagram of an image pick up apparatus according to an eighth embodiment of the present invention.

FIG. 17 is a block diagram of an image pick up apparatus according to an eighth embodiment of the present invention. The image pick up apparatus of the eighth embodiment has the same structure and operations as the seventh embodiment except that the pixel compensation circuits 100 and 100' are not provided in the eighth embodiment. Even in the eighth embodiment, the above-mentioned advantageous effects caused by the vertical contour compensation circuit 501 can be achieved. FIG. 18 is a graph showing an output signal from the clipper 24a responding to an input signal into the second horizontal low-pass circuit 7a in the vertical contour compensation circuit 501. In this embodiment, pixel signals which are inputted into the second and third horizontal low-pass circuits 7a and 7b are shown by dotted lines of FIG. 18, and outputted signals from the second and third horizontal low-pass circuits 7a and 7b are shown by one dotted lines. Here, a WG line denotes an average value of white and green pixels, and a CyYe line denotes an average value of cyan and yellow pixels. At this time, if the subtraction of WG line and the CyYe line is performed in the subtracter 57, the image quality is deteriorated in the area B as shown in FIG. 18. In the present invention, clip levels of the clippers 24a and 24b are determined at the clip level CW or below whereby the difference of luminance between scanning lines forming an imageis. Preferably, the clip value is lower than the clip level CW due to the error of response in each of the combination circuits. In addition, the vertical contour compensation circuit 501 can be applied to the vertical contour compensation circuit 500 through this specification.

Figure 19A:
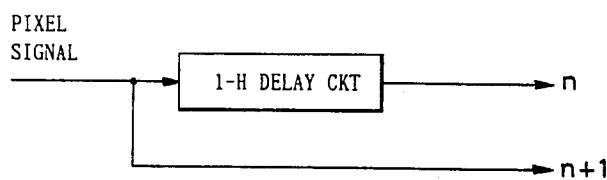
FIG. 19A is a block diagram showing a structure for making an n line coincident with an n+1 line by means of one 1-H delay circuit.
Figure 19B:
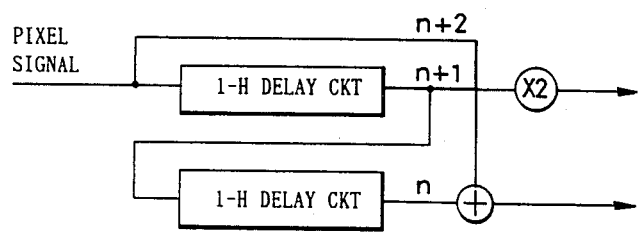
FIG. 19B is a block diagram showing a structure for making an n line coincident with an n+1 line by means of two 1-H delay circuits.

FIG. 19A is a block diagram showing a structure for making an n line coincident with an n+1 line by means of one 1-H delay circuit, and FIG. 19B is a block diagram showing a structure for making an n line coincident with an n+1 line by means of two 1-H delay circuits. In the present invention, although only one 1-H delay circuit is used just like a structure as shown in FIG. 19A, a structure in which two 1-H delay circuits are used can be applied to the present embodiments.

Figure 20:
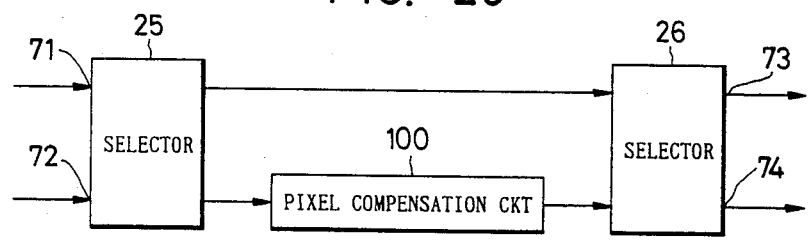
FIG. 20 is a block diagram showing a pixel compensation circuit having two line selectors according to the ninth embodiment of the invention.

In the present embodiments, in the case that either of the pixel compensation circuit 100 or 100', one example of the structure shown in FIG. 20 can be applied thereto. FIG. 20 is a block diagram showing a pixel compensation circuit having two line selectors 25 and 26 according to the ninth embodiment of the invention. For example, if the two line selectors 25 and 26 are applied to the pixel compensation circuit 100 of the first embodiment, the structure of the ninth embodiment is as follows. The output signal from the amplifier 2 is inputted into a terminal 71 of the selector 25, and the output signal from the 1-H delay circuit 3 is inputted into a terminal 72 of the selector 25. One output signal from the selector 25 is directly inputted into the selector 26, and the other output signal from the selector 25 is inputted, via the pixel compensation circuit 100, into the selector 26. An input signal of the subtracter 51 is fed from an output terminal 73 the second selector 26, and an input signal of the adder 52 is fed from the output terminal 74 of the second selector 26. More specifically, in the selector 25 responsive to the output signal from the amplifier 2 and an output signal from the 1-H delay circuit 3, one signal which is to be compensated is selected. The one signal which is to be compensated is fed to the pixel compensation circuit 100, and the other signal is directly fed to the selector 26. The selector 25 having the input terminal 71 in which the output signal from the amplifier 2 is inputted and the input terminal 72 in which the output signal from the 1-H delay circuit 3. Meanwhile, in the selector 26 responsive to the weighted signal and the other signal from the selector 25, such an inputted weighted signal and the other inputted signal from the selector 25 is outputted.

It is to be noted that the weighted signal is outputted from the terminal 73 of the selector 26 when the one signal which is to be compensated is inputted into the terminal 71 of the first selector 25 and that the weighted signal is outputted from the terminal 74 of the selector 26 when the one signal which is to be compensated is inputted into the terminal 72 of the selector 25.

Besides, in the ninth embodiment, the vertical contour compensation circuit 501 and clipper 19 can be applied. The present embodiments are not limited by the NTSC encoder 10, and can be applied to facsimiles, scanners, copy machines, etc.

The above-described embodiments are just examples of the present invention, and therefore, it will be apparent for those skilled in the art that many modifications and variations may be made without departing from the scope of the present invention.

What is claimed is:

1. An image pick-up apparatus comprising:
    (a) an image pick up device means for picking up an image and for producing a pixel signal indicative of said image;
    (b) a 1-H delay circuit means responsive to said pixel signal from said image pick up device means for delaying said pixel signal by 1H;
    (c) a first pixel compensation circuit means responsive to an output signal from said 1-H delay circuit means for generating a first weighted signal;
    (d) a second pixel compensation circuit means responsive to said pixel signal from said image pick up device means for generating a second weighted signal;
    (e) a vertical contour compensation circuit means for emphasizing contours defined by said first and second weighted signals, thereby producing a vertical contour compensation signal;
    (f) a first adder means for adding said first weighted signal to said second weighted signal;
    (g) a horizontal low-pass circuit means responsive to an output signal from said first adder means;
    (h) a second adder means for adding an output signal from said horizontal low-pass circuit means to said vertical contour compensation signal;
    (i) a circuit means responsive to an output signal from said second adder means to generate a luminance signal;
    (j) a color operation circuit means responsive to said pixel signal from said image pick up device means and to said output signal from said 1-H delay circuit means for generating color difference signals; and
    (k) an encoder means responsive to said luminance signal and said color difference signals for obtaining a video signal.

2. An image pick up apparatus as claimed in claim 1, wherein said first pixel compensation circuit means includes:
    (i) a pixel weighting circuit means responsive to said output signal from said 1-H delay circuit means for weighting said output signal from said 1-H delay circuit means; and
    (ii) a band separating operation circuit means for weighting a high-frequency component signal in said output signal from said 1-H delay circuit means, said band separating operation circuit means having:
        a first horizontal high-pass circuit means responsive to an output signal from said first pixel weighting circuit means;

a first horizontal low-pass circuit means responsive to said output signal from said 1-H delay circuit means; and a first adder circuit for adding an output signal from said first horizontal high-pass circuit means to an output signal from said first horizontal low-pass circuit means and for generating said first weighted signal, and wherein said second pixel compensation circuit means includes:

(i) a second pixel weighting circuit means responsive to said pixel signal from said image pick up device means for weighting said pixel signal; and (ii) a second band separating operation circuit means for weighting a high-frequency component signal in said pixel signal, said second band separating operation circuit means having:

a second horizontal high-pass circuit means responsive to an output signal from said second pixel weighting circuit means;

a second horizontal low-pass circuit means responsive to said pixel signal; and a second adder circuit for adding an output signal from said second horizontal high-pass circuit means to an output signal from said second horizontal low-pass circuit means and for generating said second weighted signal.

3. An image pick up apparatus as claimed in claim 1, wherein said first pixel compensation circuit means includes:

(i) a first pixel weighting circuit means responsive to said output signal from said 1-H delay circuit means for weighting said output signal from said 1-H delay circuit means; and (ii) a first band separating operation circuit means for weighting a high-frequency component signal in said output signal from said 1-H delay circuit means, said first band separating operation circuit means including:

a first subtracter circuit for subtracting said output signal of said first pixel weighting circuit means from said output signal of said 1-H delay circuit means;

a first horizontal low-pass circuit means responsive to an output signal from said first subtracter means; and first adder means for adding an output signal from said horizontal low-pass circuit means to said output signal from said first pixel weighting circuit means, and wherein said second pixel compensation circuit means includes:

(i) a second pixel weighting circuit means responsive to said pixel signal from said image pick up device means for weighting said pixel signal; and (ii) a second band separating operation circuit means for weighting a high-frequency component signal in said pixel signal, said second band separating operation circuit means including:

a second subtracter circuit for subtracting an output signal of said second pixel weighting circuit means from said pixel signal;

a second horizontal low-pass circuit means responsive to an output signal from said second subtractor circuit; and a second adder means for adding an output signal from said second horizontal low-pass circuit means and said output signal from said second pixel weighting circuit means.

4. An image pick up apparatus as claimed in claim 1, wherein said vertical contour compensation circuit means includes:

(i) a subtracter means responsive to said first and second weighted signals for subtracting said second weighted signal from said first weighted signal; and (ii) a horizontal low-pass circuit means responsive to an output signal from said subtracter means for obtaining said vertical contour compensation signal.

5. An image pick up apparatus as claimed in claim 1, wherein said vertical contour compensation circuit means includes:

a first horizontal low-pass circuit means responsive to said second weighted signal;

a first clipper means for clipping an output signal from said first horizontal low-pass circuit means in accordance with a predetermined clip value;

a second horizontal low-pass circuit means responsive to said first weighted signal;

a second clipper means for clipping an output signal from said second horizontal low-pass circuit means in accordance with said predetermined clip value; and a subtracter means for subtracting an output signal of said first clipper means from an output signal of said second clipper means and for feeding a subtracted signal thereof to said second adder means.

6. An image pick up apparatus as claimed in claim 1, wherein said first pixel weighting circuit means includes:

a first switching pulse generator means for generating first switching pulses;

a first memory means for generating at least two factors which are to be multiplied by said output signal from said 1-H delaying circuit means;

a first selector means for selecting one of said at least two factors in accordance with said first switching pulses; and a first multiplier means responsive to an output signal from said first selector means for multiplying said output signal from said 1-H delaying circuit means by said one of said at least two factors, and wherein said second pixel weighting circuit means includes:

a second switching pulse generator means for generating second switching pulses;

a second memory means for providing at least two factors which are to be multiplied by said pixel signal from said image pick up device means;

a second selector means for selecting one of the second-mentioned at least two factors in accordance with said second switching pulses; and a second multiplier means for multiplying said pixel signal from said image pick up device means by said one of said second-mentioned at least two factors.

7. An image pick up apparatus as claimed in claim 1, wherein said circuit means includes:

a gamma correction circuit means responsive to said output signal from said second adder means; and a horizontal contour compensation circuit means for compensating for an output signal from said gamma correction circuit means to obtain said luminance signal.

8. An image pick up apparatus as claimed in claim 1, wherein said color operation circuit means includes:
- a color separation circuit means responsive to said pixel signal from said image pick up device means and said output signal from said 1-H delay circuit means for obtaining color signals of R, G, and B; and
- a color signal processing circuit means responsive to said color signals for obtaining said color difference signals.

9. An image pick up apparatus as claimed in claim 3, wherein said vertical contour compensation circuit means includes:
- a first horizontal low-pass circuit means responsive to said second weighted signal;
- a first clipper means for clipping an output signal from said first horizontal low-pass circuit means in accordance with a predetermined clip value;
- a second horizontal low-pass circuit means responsive to said first weighted signal;
- a second clipper means for clipping an output signal from said second horizontal low-pass circuit means in accordance with said predetermined clip value; and
- a subtracter means for subtracting an output signal of said first clipper means from an output signal of said second clipper means and for feeding a subtracted signal thereof to said second adder means.

10. An image pick up apparatus as claimed in any one of claims 1, 3, 5, and 9 above, wherein said image pick up device means includes:
- an image pick up device for picking up an image and for producing said pixel signal;
- an amplifier responsive to said pixel signal for amplifying said pixel signal and for producing an amplified pixel signal;
- a color temperature detecting circuit means for detecting color temperature values of said image and for producing color temperature signals each indicative of each of said color temperature values;
- a color temperature-clip level converter means responsive to said color temperature signals for converting said color temperature signals into clip level signals indicative of clip levels each corresponding to each of said color temperature values, and for providing said clip level signals; and
- a clipper means for clipping said amplified pixel signal in accordance with said clip level signals and for producing a signal representing an output signal of said image pick up device means.

11. An image pick up apparatus comprising:
(a) a first image pick up device means having a green color filter for generating a first pixel signal;
(b) a second image pick up device means having a red and blue color filter for generating a second pixel signal;
(c) a red and blue signal separating circuit means responsive to an output signal from said second image pick up device means for separating said output signal from said second image pick up device means into a red signal and a blue signal;
(d) a color signal processing circuit means responsive to said first pixel signal from said first image pick up device means, said red signal, and said blue signal for producing color difference signals;
(e) a pixel compensation circuit means responsive to said second pixel signal from said second image pick up device means for providing a weighted signal;
(f) a first adder means for adding said weighted signal to said first pixel signal from said first image pick up device means;
(g) a 1-H delay circuit means responsive to an output signal from said first adder means for producing a delayed signal;
(h) a vertical contour compensation circuit means for emphasizing contours defined by an output signal from said first adder means and said delayed signal, thereby producing a vertical contour compensation signal;
(i) a second adder means for adding said output signal from said first adder means to said delayed signal from said 1-H delay circuit means;
(j) a horizontal low-pass circuit means responsive to an output signal from said second adder means;
(k) a third adder means for adding an output signal from said horizontal low-pass circuit means to said vertical contour compensation signal;
(l) a circuit means responsive to an output signal from said third adder means to obtain luminance signal; and
(m) an encoder means responsive to said luminance signal and said color difference signals for obtaining a video signal.

12. An image pick up apparatus as claimed in claim 11, wherein said pixel compensation circuit means includes:
(i) a pixel weighting circuit means responsive to said output signal from said second image pick up device means for weighting said output signal from said second image pick up device means; and
(ii) a band separating operation circuit means for weighting a high-frequency component signal in said output signal from said second image pick up device means, said band separating operations circuit means having:
- a horizontal high-pass circuit means responsive to an output signal from said pixel weighting circuit means;
- a horizontal low-pass circuit means responsive to said output signal from said second image pick up device means; and
- an adder means for adding an output signal from said horizontal high-pass circuit means and an output signal from said horizontal low-pass circuit means and for providing said weighted signal.

13. An image pick up apparatus as claimed in claim 11, wherein said vertical contour compensation circuit means includes:
(i) a subtracter means responsive to said output signal from said second adder means and an output signal from said 1-H delay circuit means for subtracting said output signal of said second adder means from said output signal of said 1-H delay circuit means; and
(ii) a horizontal low-pass circuit means responsive to an output signal from said subtracter means for obtaining said vertical contour compensation signal.

14. An image pick up apparatus as claimed in claim 12, wherein said band separating operation circuit means includes:
- a subtracter means for subtracting said output signal of said pixel weighting circuit means from said output signal of said second image pick up device means;

a horizontal low-pass circuit means responsive to an output signal from said subtracter means; and a second adder means for adding an output signal from said horizontal low-pass circuit means and said output signal from said pixel weighting circuit means.

15. An image pick up apparatus as claimed in claim 11, wherein said vertical contour compensation circuit means includes:

a first horizontal low-pass circuit means responsive to said output signal from said first adder means;

a first clipper means for clipping an output signal from said first horizontal low-pass circuit means in accordance with a predetermined clip value;

a second horizontal low-pass circuit means responsive to said delayed signal from said 1-H delay circuit means;

a second clipper means for clipping an output signal from said second horizontal low-pass circuit means in accordance with said predetermined clip value; and a subtracter means for subtracting an output signal of said first clipper means from an output signal of said second clipper means and for feeding a subtracted signal thereof to said third adder means.

16. An image pick up apparatus comprising:
(a) an image pick up section including:
an image pick up device for picking up an image and for producing a pixel signal;
an amplifier responsive to said pixel signal for amplifying said pixel signal and for producing an amplified pixel signal;
a color temperature detecting circuit means for detecting color temperature values of said image and for producing color temperature signals each indicative of each of said color temperature values:
a color temperature-clip level converter means responsive to said color temperature signals for converting said color temperature signals into clip level signals indicative of clip levels each corresponding to each of said color temperature values; and
a clipper means for clipping said amplified pixel signal in accordance with said clip level signals and for producing a clipped signal representing an output signal of said image pick up section;
(b) a pixel compensation circuit means responsive to said output signal from said image pick up section for providing a weighted signal;
(c) a 1-H delay circuit means responsive to an output signal from said pixel compensation circuit means for delaying said weighted signal from said pixel compensation circuit means by 1H producing a second weighted signal;
(d) a vertical contour compensation circuit means for emphasizing contours defined by said first and second weighted signal by producing a vertical contour compensation signal;
(e) a horizontal low-pass circuit means responsive to said weighted signal from said pixel compensation circuit means;
(f) an adder means for adding said vertical contour compensation signal from said vertical contour compensation circuit means to an output signal from said horizontal low-pass circuit means;

(g) a circuit means responsive to an output signal from said adder means to obtain a luminance signal;
(h) a color signal generating circuit means responsive to said output signal from said image pick up section for producing color difference signals; and
(i) an encoder means responsive to said luminance signal and said color difference signals for obtaining a video signal.

17. An image pick up apparatus as claimed in claim 16, wherein said pixel compensation circuit means includes:

(i) a pixel weighting circuit means responsive to said pixel signal from said image pick up device means for weighting said pixel signal; and (ii) a band separating operation circuit means for weighting a high-frequency component signal in said pixel signal from said image pick up device means, said band separating operation circuit means having:

a horizontal high-pass circuit means responsive to an output signal from said pixel weighting circuit means;

a horizontal low-pass circuit means responsive to said pixel signal from said image pick up device means; and an adder means for adding an output signal from said horizontal high-pass circuit means to an output signal from said horizontal low-pass circuit means providing said weighted signal.

18. An image pick up apparatus as claimed in claim 16, wherein said vertical contour compensation circuit means includes:

(i) a subtracter means responsive to said output signal from said output signal from said pixel compensation circuit means and an output signal from said 1-H delay circuit means for subtracting said output signal of said pixel compensation circuit means from said output signal of said 1-H delay circuit means; and (ii) a horizontal low-pass circuit means responsive to an output signal from said subtracter means for obtaining said vertical contour compensation signal.

19. An image pick up apparatus as claimed in claim 17, wherein said band separating operation circuit means includes:

a subtracter means for subtracting said output signal of said pixel weighting circuit means from said pixel signal of said image pick up device means;

a second horizontal low-pass circuit means responsive to an output signal from said subtracter means; and a second adder means for adding an output signal from said second horizontal low-pass circuit means to said output signal from said pixel weighting circuit means.

20. An image pick up apparatus as claimed in claim 16, wherein said vertical contour compensation circuit means includes:

a horizontal low-pass circuit means responsive to said weighted signal;

a clipper means for clipping an output signal from said horizontal low-pass circuit means in accordance with a predetermined clip value;

a second horizontal low-pass circuit means responsive to said output signal from said 1-H delay circuit means;

a second clipper means for clipping an output signal from said second horizontal low-pass circuit means in accordance with said predetermined clip value; and a subtracter means for subtracting an output signal of said first clipper means from an output signal of said second clipper means.

21. An image pick up apparatus as claimed in any one of claims 16 through 20 above, wherein said color signal generating circuit means includes:

a horizontal high-pass circuit means responsive to said pixel signal from said image pick up device means;

a detector for detecting an output signal from said second horizontal high-pass circuit means;

an additional horizontal low-pass circuit means responsive to an output signal from said detector;

a white level adjusting circuit means for adjusting a white level in output signal from said additional horizontal low-pass circuit means;

a 1-H delay circuit means responsive to an output signal from said white level adjusting circuit means; and a switching circuit means responsive to said output signal from said white level adjusting circuit means and an output signal from said 1-H delay circuit means for coincidentally providing signals indicative of said color difference signals.

22. An image pick up apparatus comprising:
(a) an image pick up including:
   an image pick up device for picking up an image and for producing a pixel signal;
   an amplifier responsive to said pixel signal for amplifying said pixel signal and for producing an amplified pixel signal;
   a color temperature detecting circuit means for detecting color temperature values of said image and for producing color temperature signals each indicative of each of said color temperature values;
   a color temperature-clip level converter means responsive to said color temperature signals for converting said color temperature signals into clip level signals indicative of clip levels each corresponding to each of said color temperature values, and for outputting said clip level signals; and
   a clipper means for clipping said amplified pixel signal in accordance with said clip level signals and for producing a clipped signal representing an output signal of said image pick up section;
(b) a 1-H delay circuit means responsive to said output signal from said image pick up deice means for delaying said output signal from said image pick up section by 1H;
(c) a vertical contour compensation circuit means for emphasizing contours defined by said output signal from said image pick up section and an output signal from said 1-H delay circuit means, thereby producing a vertical contour compensation signal, said vertical contour compensation circuit means including:
   (i) a subtracter means responsive to said output signal from said image pick up section and said output signal from said 1-H delay circuit means for subtracting said output signal of said image pick up section from said output signal of said 1-H delay circuit means; and
   (ii) a first horizontal low-pass circuit means responsive to an output signal from said subtracter means for obtaining said vertical contour compensation signal;
(d) a first adder means for adding said output signal from said image pick up section to said output signal from said 1-H delay circuit means;
(e) a second horizontal low-pass circuit means responsive to an output signal from said first adder means;
(f) a second adder means for adding said vertical contour signal to an output signal from said second horizontal low-pass circuit means;
(g) a circuit means responsive to an output signal from said second adder means to obtain a luminance signal;
(h) a color operation circuit means responsive to said output signal from said image pick up section and said output signal from said 1-H delay circuit means for producing color difference signals; and
(i) an encoder means responsive to said luminance signal and said color difference signals for obtaining a video signal.

23. An image pick up apparatus comprising:
(a) an image pick up section including:
   an image pick up device for picking up an image and for producing a pixel signal representing said image;
   an amplifier responsive to said pixel signal for amplifying said pixel signal and for producing an amplified pixel signal;
   a color temperature detecting circuit means for detecting color temperature values of said image and for producing color temperature signals each indicative of each of said color temperature values;
   a color temperature-clip level converter means responsive to said color temperature signals for converting said color temperature signals into clip level signals indicative of clip levels each corresponding to each of said color temperature values, and for generating said clip level signals; and
   a clipper means for clipping said amplified pixel signal in accordance with said clip level signals and for producing a clipped signal representing an output signal of said image pick up section;
(b) a 1-H delay circuit means responsive to said output signal from said image pick up device section for delaying said output signal from said image pick up section by 1H;
(c) a vertical contour compensation circuit means for emphasizing contours defined by said output signal from said image pick up section and an output signal from said 1-H delay circuit means, thereby producing a vertical contour compensation signal, said vertical contour compensation circuit means including:
   (i) a first horizontal low-pass circuit means responsive to said output signal from said image pick up section;
   (ii) a second clipper means for clipping an output signal from said first horizontal low-pass circuit means in accordance with a predetermined clip value;
   (iii) a second horizonal low-pass circuit means responsive to said output signal from said 1-H delay circuit means;

(iv) a third clipper means for clipping an output signal from said second horizontal low-pass circuit means in accordance with said predetermined clip value; and (v) a second subtracter means for subtracting an output signal of said second clipper means from an output signal of said third clipper means and for feeding a subtracted signal thereof to said second adder means;

(d) a first adder means for adding said output signal from said image pick up section to said output signal from said 1-H delay circuit means;

(e) a third horizontal low-pass circuit means responsive to an output signal from said first adder means;

(f) a second adder means for adding said vertical contour signal to an output signal from said third horizontal low-pass circuit means;

(g) a circuit means responsive to an output signal from said second adder means to obtain a luminance signal;

(h) a color operation circuit means responsive to said output signal from said image pick up section and said output signal from said 1-H delay circuit means for producing color difference signals; and (i) an encoder means responsive to said luminance signal and said color difference signals for obtaining a video signal.

24. An image pick up apparatus comprising:
(a) an image pick up section including:
  (i) an image pick up device for picking up an image and for producing a pixel signal; and
  (ii) an amplifier responsive to said pixel signal for amplifying said pixel signal and for producing an amplified pixel signal indicative of an output signal from said image pick up section;
(b) a 1-H delay circuit means responsive to said output signal from said image pick up section for delaying said output signal from said image pick up section by 1H;
(c) a first selector means responsive to said output signal from said image pick up section and an output signal from said 1-H delay circuit means for selecting one signal which is to be compensated and for providing said one signal and the other signal, said first selector means having a first input terminal to which said output signal from said image pick up section is received and a second input terminal to which said output signal from said 1-H delay circuit means is received;
(d) a pixel compensation circuit means responsive to said one signal from said first selector means for providing a weighted signal, said pixel compensation circuit means including:
  (i) a pixel weighting circuit means responsive to said one signal from said first selector means for weighting said one signal from said first selector means; and
  (ii) a band separating operation circuit means for weighting a high-frequency component signal in said one signal from said first selector means, said first band separating operation circuit means having:
    a horizontal high-pass circuit means responsive to an output signal from said pixel weighting circuit means;
    a first horizontal low-pass circuit means responsive to said one signal from said first selector means; and
    a first adder means for adding an output signal from said horizontal high-pass circuit means to an output signal from said first horizontal low-pass circuit means to provide said weighted signal;

(e) a second selector means responsive to said weighted signal and said other signal from said first selector means for providing said weighted signal and said other signal from said first selector means such that said weighted signal is provided from a first terminal of said second selector means when said one signal which is to be compensated is received by said first terminal of said first selector means, and that said weighted signal is provided from said second terminal of said second selector means when said one signal which is to be compensated is received by said second terminal of said first selector means;

(f) a vertical contour compensation circuit means to produce a vertical contour compensation signal for emphasizing contours defined by output signals from said first and second terminals of said second selector means, said vertical contour compensation circuit means including:
  (i) a subtracter means responsive to said output signals from said first and second terminals of said output signals from said first and second terminals of said second selector means for subtracting said output signal of said second terminal of said second selector means from said output signal from said first terminal of said second selector means; and
  (ii) a horizontal low-pass circuit means responsive to an output signal from said subtracter means for obtaining said vertical contour compensation signal;

(g) an adder means for adding said output signals from said first and second terminals of said second selector means to each other;

(h) a horizontal low-pass circuit means responsive to an output signal from said second adder means;

(i) a second adder means for adding an output signal from said horizontal low-pass circuit means to said vertical contour compensation signal;

(j) a circuit means responsive to an output signal from said second adder means to obtain a luminance signal;

(k) a color operation circuit means responsive to said output signal from said image pick up device means and said output signal from said 1-H delay circuit means for obtaining color difference signals; and (l) an encoder means responsive to said luminance signal and said color difference signals for obtaining a video signal.

25. An image pick up apparatus as claimed in claim 24, wherein said band separating operation circuit means includes:
a subtracter means for subtracting said output signal of said pixel weighting circuit means from said one signal from said first selector means;
a second horizontal low-pass circuit means responsive to an output signal from said second subtracter means; and
a second adder means for adding an output signal from said second horizontal low-pass circuit means to said output signal from said pixel weighting circuit means.

* * * * *

UNITED STATES PATENT AND TRADEMARK OFFICE
CERTIFICATE OF CORRECTION

PATENT NO. : 4,903,121
DATED : February 20, 1990
INVENTOR(S) : Kenya Uomori, et al.

It is certified that error appears in the above-identified patent and that said Letters Patent is hereby corrected as shown below:

On the title page, under "Foreign Application Priority Date" change the number of the second Japanese application from "62-12612" to --62-126212--.

Signed and Sealed this

Second Day of July, 1991

Attest:

HARRY F. MANBECK, JR.

*Attesting Officer*　　　*Commissioner of Patents and Trademarks*